United States Patent [19]

Klein et al.

[11] Patent Number: 4,957,402

[45] Date of Patent: Sep. 18, 1990

[54] T-NUT WITH FURROWS

[76] Inventors: Georg D. Klein, R.F.D. 2, Lynch Rd., Monson, Mass. 01057; Frank E. Carter, P.O. Box 39, Wales Rd., Brimfield, Mass. 01010

[21] Appl. No.: 347,577

[22] Filed: May 5, 1989

[51] Int. Cl.$^5$ .................. F16B 27/00; F16B 39/00; F16B 33/00

[52] U.S. Cl. .................................. 411/84; 411/166; 411/378; 411/427

[58] Field of Search ............... 411/427, 403, 401, 435, 411/402, 378, 84, 169, 966, 166

[56] References Cited

U.S. PATENT DOCUMENTS

| 2,281,482 | 4/1942 | Crayton | 411/403 |
|---|---|---|---|
| 2,632,355 | 3/1953 | Becker | 411/427 |
| 3,456,549 | 7/1969 | Horton | 411/427 |
| 3,456,706 | 7/1969 | Ollis, Jr. | 411/84 |

FOREIGN PATENT DOCUMENTS

| 2727621 | 1/1979 | Fed. Rep. of Germany | 411/427 |
|---|---|---|---|
| 2736131 | 2/1979 | Fed. Rep. of Germany | 411/378 |

OTHER PUBLICATIONS

Excerpts from the Flexible Fixturing Systems, Inc. catalog, entitled "Hadler Modular Jig and Fixture System 70"—May 1988 edition.

Primary Examiner—Rodney M. Lindsey

[57] ABSTRACT

A T-nut is disclosed for accurately affixing work beds to the base of a machine. The preferred nut comprises a generally flat head; a shank that is integral with and extends upwardly from the head; and a pair of furrows —one on each side of the shank, at its juncture with the head. The furrows are designed to straddle the burrs sometimes found in the T-slots of a machine base, so that the nut will sit flush within the slot, rather than be canted.

5 Claims, 1 Drawing Sheet

ND FURROWS

BACKGROUND OF THE INVENTION

This invention relates to T-nuts for attaching a work bed to a milling or grinding machine. More particularly, it deals with a T-nut to overcome burrs commonly found in the T-slots of the base to which the bed is attached.

Virtually all milling or grinding machines have a base with a T-slot like that shown in this application's FIG. 3. T-nuts are inserted into the slots, from the underside of the base. Their flat heads are retained within an underside of the slot, while their shanks extend upwardly and are exposed.

The shanks typically, like the present invention, have a vertical throughbore that is internally threaded. This permits a work bed to be fastened onto the machine's base, by screwing a bolt through the bed and into the shank's throughbore.

The work bed is required when a machinist wants to mill or grind a part. It holds the piece being machined in place, and is usually a jig, fixture or simple clamp. If the bed is not bolted properly, the finished piece may be machined improperly.

Oftentimes, the T-slots have burrs on their shoulders because of initial tooling. Because the burrs are located under the base, they are often not seen or thought of. Therefore, they are not filed down by the manufacturer.

If the flat head of the T-nut meets a burr during tightening, the head and shank can be tilted slightly. This can throw the attached work bed slightly off kilter and affect the quality of the finished machined part. Since many machined products require extremely close tolerances, this skewing cannot be tolerated.

Accordingly, it is the primary object of the present invention to provide a T-nut which overcomes the burring problem found in T-slots.

It is more specific object to provide a T-nut with a pair of furrows on opposite sides of its base, adjacent to the shank, whereby the furrows straddle any burrs on the T-slot's shoulders and provide a flush or squared sitting of the nut in the slot.

It is another object to provide such a T-nut, which is made from a cold-drawn process, whereby the nut is simple to manufacture, yet extremely durable to use.

The above and other objects of this invention will become more readily apparent when the following description is read in conjunction with the accompanying drawings.

DETAILED DESCRIPTION OF THE PREFERRED EMBODIMENT

Figure 1:
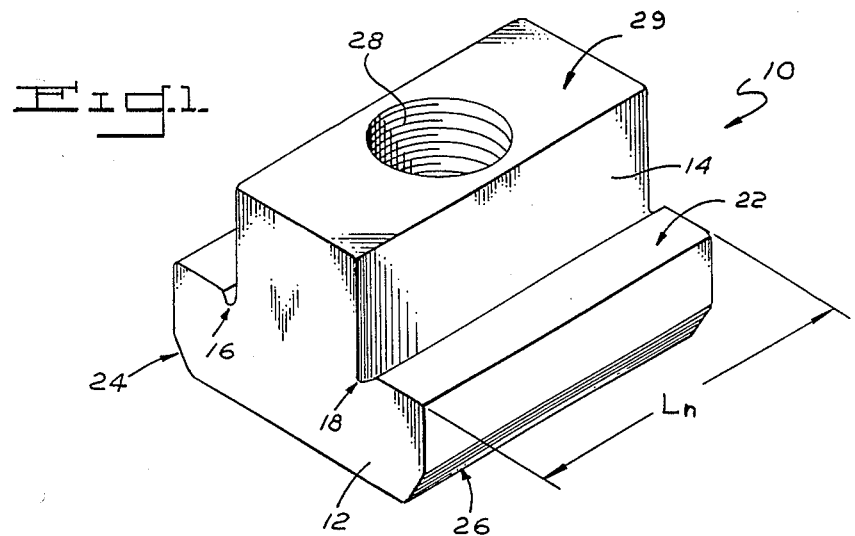
FIG. 1 is a perspective view of a T-nut constructed in accordance with the present invention.

Referring to the drawings in detail, a unique T-nut is shown and generally designated by the reference numeral 10. The nut comprises a generally flat head 12; a shank 14 that extends upwardly from the head; and a pair of furrows 16, 18—one on each side of the shank, at its juncture with the head.

Figure 2:
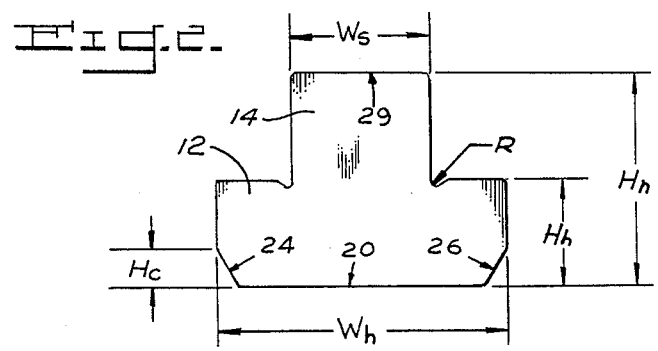
FIG. 2 is an end plan view of the T-nut, showing undercut channels or furrows along opposite sides of the shank.
Figure 3:
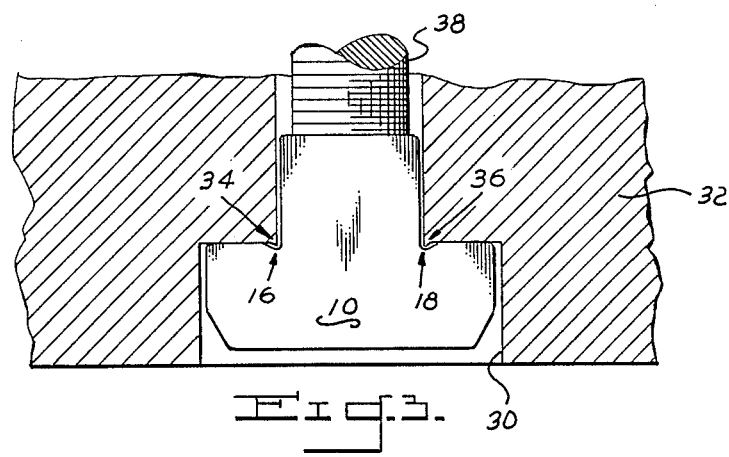
FIG. 3 shows the T-nut inside a T-slot of a machine base, where its channels straddle burrs of the slot.

As best shown in FIGS. 2 and 3, the head 12 is basically rectangular in cross section. It has a flat top and bottom surfaces 20, 22. The bottom's side edges 24, 26 are chamfered, preferably at an angle of 60°. These bottom chamfers permit the T-nut to clear leftover chips in a T-slot, and make for easy insertion.

Shank 14 is generally rectangular in cross section. The shank is integrally formed with head 12 and, in the illustrated embodiment, rises perpendicularly from it.

Inside the shank is a threaded throughbore 28. It extends through the entire nut, from the tip 29 of the shank to the nut's bottom 22.

The gist of the invention is the furrows or channels 16, 18. They are undercut portions which extend the entire length of the nut.

In the preferred embodiment, each furrow 16, 18 is arcuate in cross section. This cross section comprises a hemispherical center section and an inclined shoulder (angled at 60°) between the arc and the nut's adjacent bottom surface 22.

The preferred T-nut is made of AISI 1018 steel which has been carburized and hardened to Rockwell C 30-40. Referring to FIGS. 1 and 2, the illustrated nut has the following dimensions, though they can obviously be varied to fit the particular T-slot in which the nut will be used: the nut's overall length $L_n$ is approximately 1.125 inches; the nut's overall height $H_n$ is approximately .750 inches; the width $W_h$ of head 12 is approximately 1.125 inches; the head's height $H_h$ is approximately .360 inches; the width $W_s$ of shank 14 is approximately .615 inches; the height $H_c$ of each bottom chamfered edge 24, 26 is approximately .120 inches, with the chamfers being inclined at 60°; and the radii R of the semi-circular sections of the furrows 16, 18 are each approximately .020 inches.

T-nut 10 can be made by any suitable process. However, it is preferably formed by a standard cold-drawn process such as that utilized by the assignee of the present invention (Rathbone Precision Metals, Inc. of Palmer, Mass.).

The RATHBONE TM process involves a combination of cold-drawing, annealing and continuous quality control. First, a bar of steel is rolled to the nut's basic shape. Cold-drawing through successively smaller dies then refines and reduces that shape to extremely close tolerances—namely .002 inches. This cold-drawn process provides increased strength, longer thread life and precise interchangeability.

FIG. 3 shows a T-slot 30 in a machine base 32. The slot has burrs on the corners of shoulders 34, 36, as explained in the background section of this application.

When the T-nut 10 is inserted into the slot and tightened in place via a bolt 38 that affixes a work bed (not shown), the furrows 16, 18 straddle the burrs and allow the flat top surface 22 of the head to sit flush against the shoulder. This "squares" the nut's shank 14 and provides a relatively perfect perpendicular throughbore 28 for affixing the work bed in place.

It should be understood by those skilled in the art that obvious strucutral modifications can be made without departing from the spirit or scope of the invention. For example, instead of utilizing a T-nut with a threaded throughbore, a solid bolt could be manufactured with the same furrowed concept. In those instances, the machinist would simply attach the work bed via nuts rather than bolts. Accordingly, reference should be made primarily to the accompanying claims, rather than the foregoing specification, to determine the scope of the invention.

Having thus described the invention, what is claimed is:

1. In a T-nut of the type that fits into a T-slot in a machine base to screw a work bed onto the base, the improvement comprising:
    a. a rigid head with a top and bottom, wherein the bottom has a horizontal flat surface that maintains its shape when the work bed is screwed onto the base;
    b. a shank that is integral with the head and which extends vertically from the horizontal flat surface, wherein the shank has a threaded vertical bore; and
    c. a pair of parallel rigid furrows in the bottom of the rigid head, wherein the furrows run along opposite sides of the shank at a juncture between the shank and head, and wherein the furrows are adapted to maintain their size and shape and to straddle any burrs on a shoulder of the T-slot when the work bed is tightened in place, whereby the nut's rigid flat bottom surface sits flush against an underside of the slot and the nut's shank is squared to the base.

2. The T-nut of claim 1 wherein the nut has a given length and the furrows and shank extend the entire length of the nut.

3. The T-nut of claim 1 wherein the furrows are arcuate.

4. In a T-nut of the type that fits into a T-slot in a machine base to screw a fixture onto the base, the improvement comprising:
    a. a rigid head with a top and bottom, wherein the bottom has a horizontal flat surface that maintains its shape when the fixture is screwed onto the base;
    b. a shank that is integral with the head and which extends vertically from the horizontal flat surface, wherein the shank has a threaded vertical bore; and
    c. a pair of parallel rigid furrows in the bottom of the rigid head, wherein the furrows run along opposite sides of the shank at a juncture between the shank and head, and wherein the furrows are adapted to maintain their size and shape and to straddle any burrs on a shoulder of the T-slot when the fixture is tightened in place, whereby the nut's rigid flat bottom surface sits flush against an underside of the slot and the nut's shank is squared to the base.

5. In a T-nut of the type that fits into a T-slot in a machine base to screw a tool onto the base, the improvement comprising:
    a. a rigid head with a top and bottom, wherein the bottom has a horizontal flat surface that maintains its shape when the tool is screwed onto the base;
    b. a shank that is integral with the head and which extends vertically from the horizontal flat surface, wherein the shank has a threaded vertical bore; and
    c. a pair of parallel rigid furrows in the bottom of the rigid head, wherein the furrows run along opposite sides of the shank at a juncture between the shank and head, and wherein the furrows are adapted t maintain their size and shape and to straddle any burrs on a shoulder of the T-slot when the tool is tightened in place, whereby the nut's rigid flat bottom surface sits flush against an underside of the slot and the nut's shank is squared to the base.

* * * * *